W. H. SAUVAGE.
SLACK ADJUSTER.
APPLICATION FILED JAN. 25, 1916.
1,227,958.
Patented May 29, 1917.
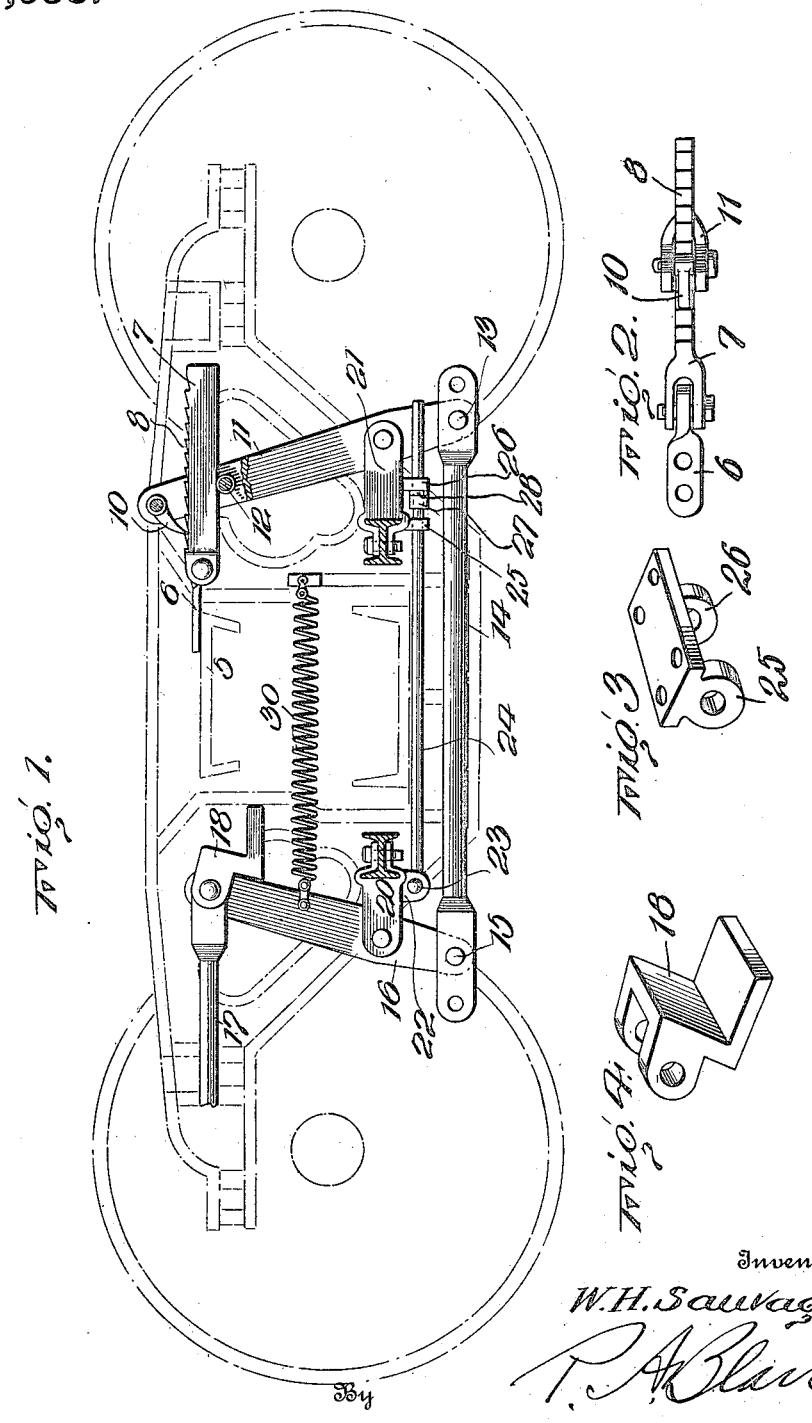
Inventor
W. H. Sauvage
By R. A. Blair
Attorney

UNITED STATES PATENT OFFICE.

WILLIAM H. SAUVAGE, OF FLUSHING, NEW YORK, ASSIGNOR TO GOULD COUPLER COMPANY, A CORPORATION OF NEW YORK.

SLACK-ADJUSTER.

1,227,958.                 Specification of Letters Patent.        Patented May 29, 1917.

Application filed January 25, 1916. Serial No. 74,194.

*To all whom it may concern:*

Be it known that I, WILLIAM H. SAUVAGE, a citizen of the United States, and resident of Flushing, in the county of Queens and State of New York, have invented certain new and useful Improvements in Slack-Adjusters, of which the following is a specification.

This invention relates to slack adjusters for the brake rigging of railway cars, and in its more intense aspect to automatic slack adjusters particularly adapted for use in connection with truck brake rigging, although it is, of course, to be understood that many features of the invention are applicable to the foundation brake rigging adjacent the power cylinder.

One of the objects of the present invention is to provide a practicable, reliable and efficient automatic slack adjuster having few parts which will be inexpensive to manufacture and install.

A further object is to provide a simple automatic slack adjuster of the above general type capable of application to truck mechanisms now in general use without material modification. A further object is to provide a slack adjuster of the first above mentioned type having parts so positioned and arranged as to insure predetermined piston travel and brake shoe clearance at all times.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1 is a side elevational view partly in section, of a truck mechanism and associated brake rigging, sufficient to illustrate and understand the present invention;

Fig. 2 is a detail view of one of the parts of the mechanism;

Fig. 3 is a detail view of a part of the temporary take up mechanism;

Fig. 4 is a detail view of a stop.

Referring now to the drawings in detail and more particularly to Fig. 1, 5 denotes a bolster of a truck of any desired type as shown in dotted lines having a projecting lug 6 at one side thereof on which is pivotally mounted a take up or ratchet bar 7 having a ratcheted upper surface 8 coacting with a pawl 10 pivotally mounted at the upper end of a dead lever 11. This dead lever is preferably bifurcated at its upper end and provided with a roller 12 coacting with the under side of the ratchet bar 7 and carries the pawl 10 between its bifurcated portions normally engaging the ratchet teeth by gravity as shown.

The lower end of the dead lever 11 is pivotally connected at the point 13 with one end of a non-extensible push bar 14, the other end of which is similarly connected at the point 15 to the lower end of live lever 16. The upper end of this live lever has a pivotal connection with a pull rod 17 of usual construction and carries a stop 18 as more clearly shown in detail view Fig. 4, adapted to coact with a part of the truck frame and limit the return movement of the live lever to normal position on release of the braking power. This stop 18 is of L-shape substantially as shown and is adapted to lie against the side edge of the lever and have a straight thrust engagement with the frame.

Both the live and dead levers are provided with brake beam struts 20 and 21 respectively and pivotally connected therewith in the usual manner. One of these struts 20 has a downwardly projecting lug or support 22 to which is pivoted at the point 23 one end of an adjusting rod 24. The opposite end of this adjusting rod passes through stops 25 and 26 depending from the other brake beam strut (see Fig. 3). Intermediate these stops 25 and 26 and secured to the adjusting rod 24 is a friction spring clamp 27 of any desired type adapted to permit movement of the adjusting rod therethrough under certain abnormal conditions in either direction but is normally designed to slip along the rod toward the right when excess travel of the brake rigging takes place. If desired one or more washers 28 may be interposed between one of the lugs and the friction spring clamp whereby the lost motion may be varied at will.

In order to return the parts to normal position after an application of the brakes a release spring 30 is associated with the live lever and a part of the truck frame and is preferably connected substantially as shown.

The device operates in substantially the following manner: An application of the brakes causes a movement of the pull rod 17 toward the left which acts and reacts through the live and dead levers, push rod 14 and support for the dead lever in a manner to cause the brake beams, if the truck is of that character, to move away from each other and carry the respective shoes into operative engagement with the peripheries of the wheel. If excess travel of the brake rigging takes place due primarily to the wear of the brake shoes, a relative slipping between the friction clamp 27 and adjusting rod 24 will take place. On release of the braking power the parts tend to return to normal position under the action of the return spring 30 and the shoes first drop away from the wheels by reason of the lost motion device, or excess space between the clamp and lugs, associated with the dead lever and thereby provide proper brake shoe clearance. When, however, excess travel has taken place, a complete return of the live lever is prevented until the temporary take up and holding mechanism constituted by the friction clamp and adjusting rod has had an opportunity to react upon the permanent take up and holding device located at the upper end of the dead lever. Further rearward movement of the brake beams toward each other is prevented by reason of the friction clamp, and reactive movement of the release spring upon the live lever will cause the upper end of the dead lever to move toward the right one or more notches as may be necessary to take up this excess travel. This movement would be aided by the return means associated with the power cylinder and rest of the brake rigging not herein shown.

When the shoes have worn to such an extent that it is necessary to replace them the pawl 10 is released and dead lever returned to substantially its original position as shown. During this return movement the adjusting rod 24 is forcibly moved through the friction clamp a corresponding amount as by means of a hand lever, thereby enabling the brake shoes to be replaced.

An application of the brakes after such operation is all that is necessary to place this mechanism in the desired operative condition.

It is thus seen that the present invention provides a simple and practical automatic slack adjuster mechanism having few parts which may be easily applied to the brake rigging now in general use on cars without material modification. It will also be seen that this mechanism may be applied to the foundation brake rigging if so desired by substituting the power cylinder for the car bolster in the same relative position and connecting the end of the live lever to the end of the cylinder piston. In fact, the invention is believed to possess numerous advantages and accomplish, among others, all of the objects above set forth.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

I claim

1. In an automatic slack adjuster, in combination, a car truck frame having a ratchet rod connected at one side thereof, a dead lever having a pawl coacting with the ratchet, a live lever at the opposite side of the frame, and parallel disposed push and adjusting rods associated with the lower ends of said levers, one of said rods having a yielding frictional supporting connection.

2. In an automatic slack adjuster, in combination, a car truck frame having a ratchet rod connected at one side thereof, a dead lever having a pawl coacting with the ratchet, a live lever at the opposite side of the frame, parallel disposed push and adjusting rods associated with the lower ends of said levers, and a stop pivotally mounted on the upper end of the live lever adapted to coact with the frame and limit the return of the parts to normal position.

3. In an automatic slack adjuster, in combination, a car truck frame, a ratchet rod, a dead lever having a pawl coacting with the ratchet, a live lever, a push rod connecting the lower ends of said levers, an adjusting rod connecting said levers near their points of connection with the brakes, one of the points of connection including a pair of relatively fixed lugs through which the adjusting rod passes, and means on said rod acting between the lugs to insure brake shoe clearance, and a release spring extending between the central part of the live lever and truck frame, said release spring, adjusting rod and push rod being substantially parallel with each other.

4. In an automatic slack adjuster, in combination, a truck frame, a dead lever at one side thereof, a permanent take up and holding device associated with the upper end of the dead lever, a live lever at the opposite side of the frame, a yielding frictional adjusting mechanism connecting said levers, and a release spring connecting the central part of said live lever with the truck frame.

5. In an automatic slack adjuster, in combination, a truck bolster, a dead lever at one side thereof, a permanent take up and holding device associated with the upper end of the dead lever, a live lever with a stop at the opposite side of the bolster, a release spring connecting the central part of said live lever with the truck frame, and adjusting mechanism including a two part member yieldingly and frictionally connected with each other and connecting said levers positioned substantially parallel to said release spring.

6. In an automatic slack adjuster, in combination, a truck bolster, a dead lever at one side thereof, a permanent take up and holding device associated with the upper end of the dead lever, a live lever at the opposite side of the bolster, a release spring connecting the central part of said live lever with the truck frame, adjusting mechanism including a pair of lugs secured to a brake beam and connecting said levers positioned substantially parallel to said release spring, and a stop associated with the upper end of the live lever adapted to coact with the truck frame and limit the return movement of the live lever to normal position.

7. In an automatic slack adjuster, in combination, a truck bolster, a dead lever at one side thereof, a permanent take up and holding device associated with the upper end of the dead lever, a live lever at the opposite side of the bolster, a release spring for said live lever positioned beneath said car bolster, adjusting mechanism connecting said levers positioned substantially parallel to said release spring, and a stop associated with the upper end of the live lever adapted to coact with the car bolster and limit the return movement of the live lever to normal position, said stop comprising an L-shape casting pivotally connected with the live lever at its point of connection with the brake actuating mechanism.

Signed at New York in the county of New York and State of New York this 16th day of December A. D. 1915.

WILLIAM H. SAUVAGE.

Copies of this patent may be obtained for five cents each, by addressing the "Commissioner of Patents, Washington, D. C."